United States Patent

Lay

[11] 3,822,961
[45] July 9, 1974

[54] VARIABLE SPEED DRILL PRESS
[75] Inventor: Michael T. Lay, West Chicago, Ill.
[73] Assignee: McGraw-Edison Company, Elgin, Ill.
[22] Filed: Nov. 21, 1972
[21] Appl. No.: 308,416

[52] U.S. Cl.................................. 408/236, 408/135
[51] Int. Cl............................................. B23b 39/00
[58] Field of Search............. 408/87, 135, 712, 129, 408/234, 236

[56] References Cited
UNITED STATES PATENTS
| | | | |
|---|---|---|---|
| 2,360,921 | 10/1944 | Wiken | 408/234 |
| 2,480,554 | 8/1949 | Couse | 408/129 |
| 3,008,155 | 11/1961 | Tsuda | 408/135 X |
| 3,257,909 | 6/1966 | Henkel | 408/135 X |
| 3,718,405 | 2/1973 | Keither et al. | 408/135 |

FOREIGN PATENTS OR APPLICATIONS
944,032  3/1949  France.................. 408/234

Primary Examiner—Andrew R. Juhasz
Assistant Examiner—Z. R. Bilinsky

[57] ABSTRACT

A variable speed drill press having a base with a column upstanding therefrom and a head secured to and adjustable heightwise on the column, a power head mounted from the column head and having a motor and a powered output shaft with a tool bit chuck thereon, an operating handle and pinion thereon mounted in the column head and engaged with a rack shaft on the power head for moving the power head in a cutting stroke relative to the column head and base, a post on the power head held by guide abutments or faces on the column head and having guide stops for adjustably limiting the cutting stroke, and a housing secured over the power head and also over the column head.

3 Claims, 5 Drawing Figures

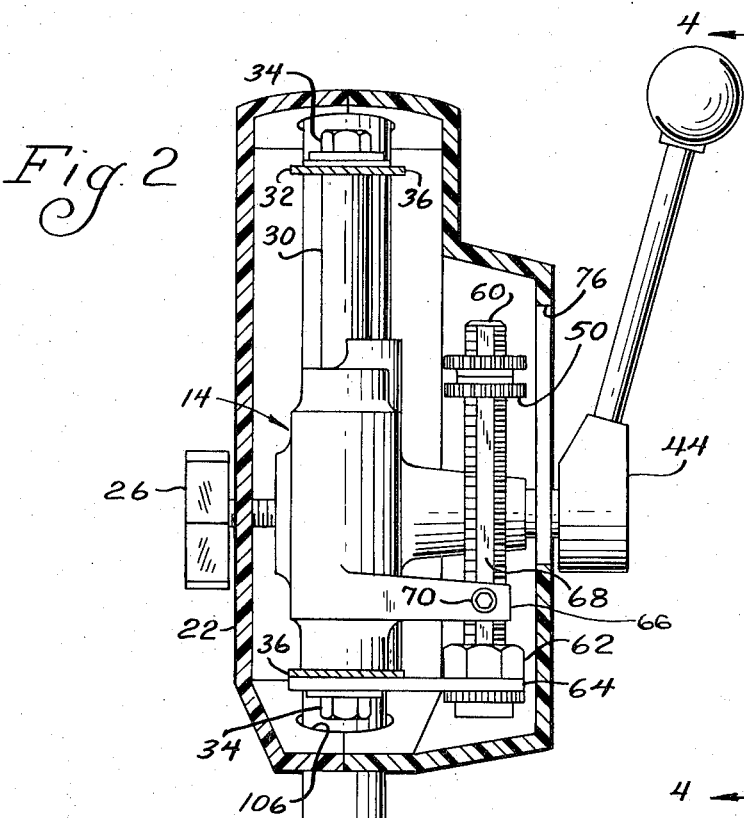
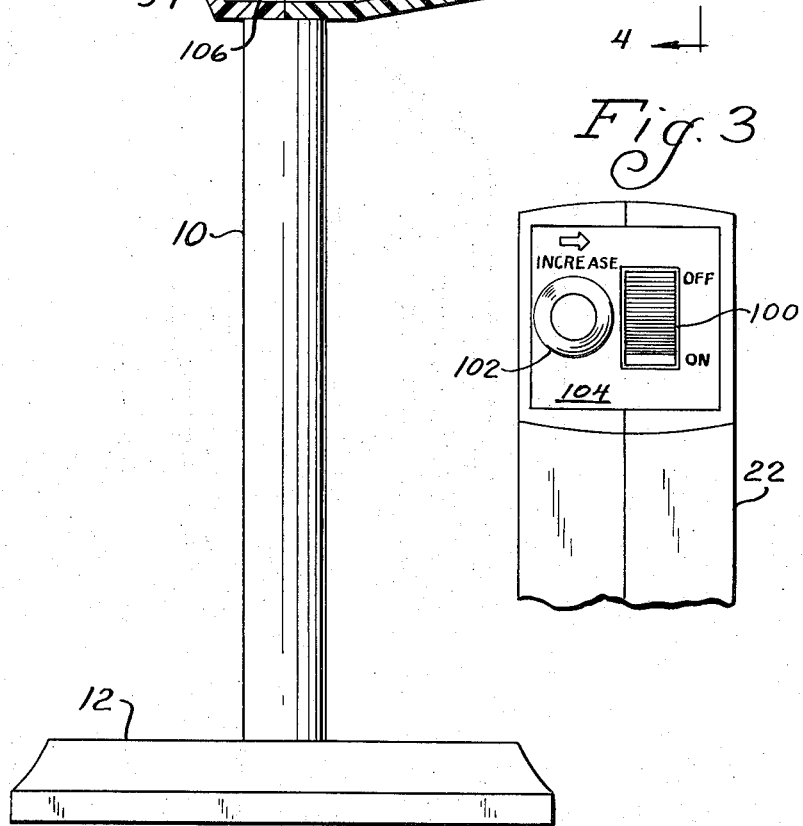

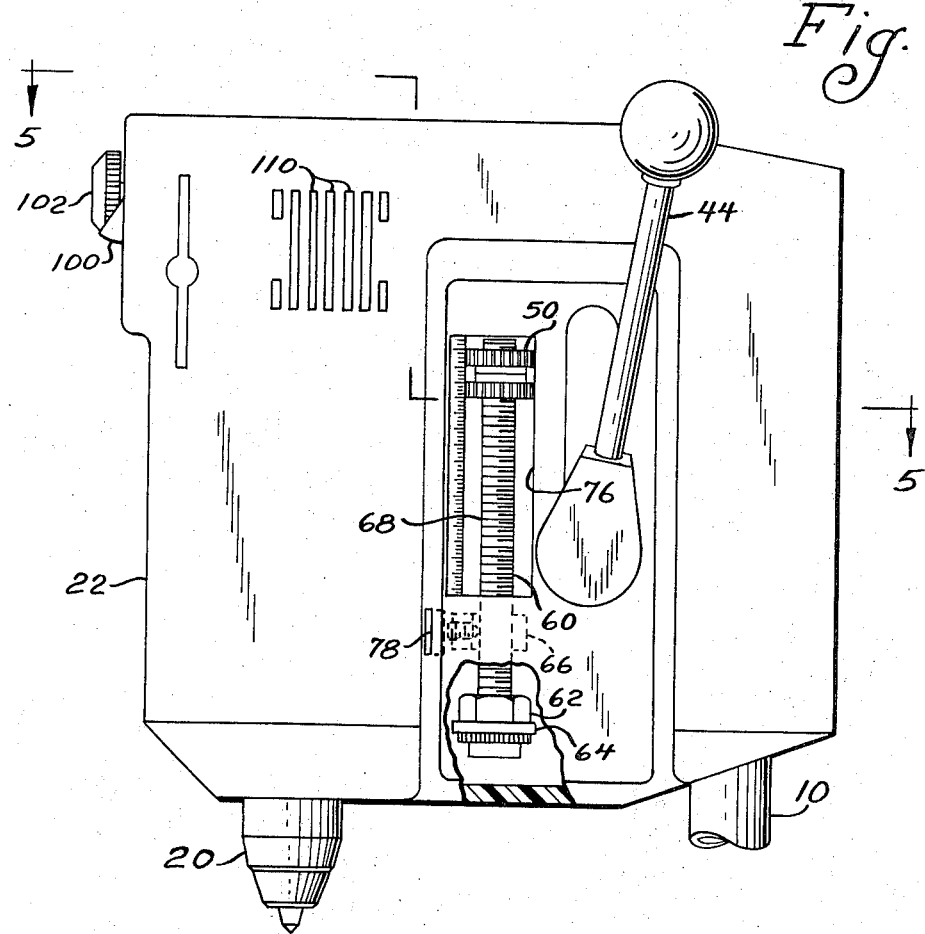
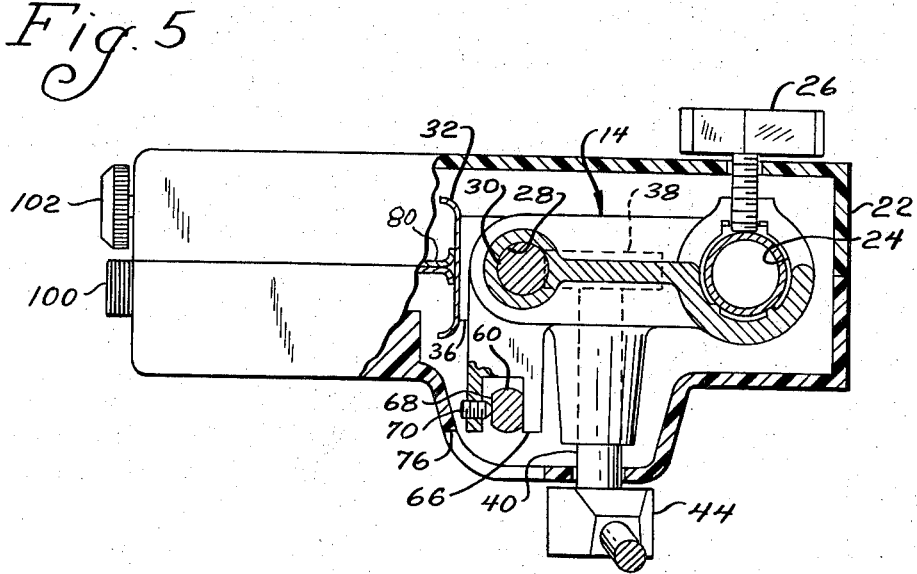

VARIABLE SPEED DRILL PRESS

This invention relates to a drill press where a powered chuck shaft is supported for movement relative to and by a column in turn upstanding from a base, the chuck shaft being supported within a modular unit including a motor and reduction gear assembly, and a single housing over the motor and reduction gear assembly and the column head.

A main feature of this invention is the provision of a drill press where the motor and reduction gear assembly is supported to move in unison with the powered output chuck shaft and thus relative to the supporting column during the cutting stroke. The disclosed drill press has a modular assembly including the motor and reduction gear train and the powered output chuck shaft, and this assembly is mounted to be shifted vertically relative to the supporting column and more particularly a column head. A pinion and engaged rack shaft, and a post and guide are mounted in operative association for adjustably supporting and moving the output chuck shaft heightwise relative to the column.

Other features and advantages will be more fully understood, after reference to the following specification, including the drawings thereof, wherein:

FIG. 2 is a elevational section view as seen generally from line 22 in FIG. 1;

FIG. 3 is a elevational view as seen generally from line 33 in FIG. 1;

FIG. 4 is a side elevational view as seen from line 4—4 in FIG. 2, with part of the casing broken away for clarity of disclosure; and FIG. 5 is a sectional view as seen generally from line 55 in FIG. 4.

Figure 1:
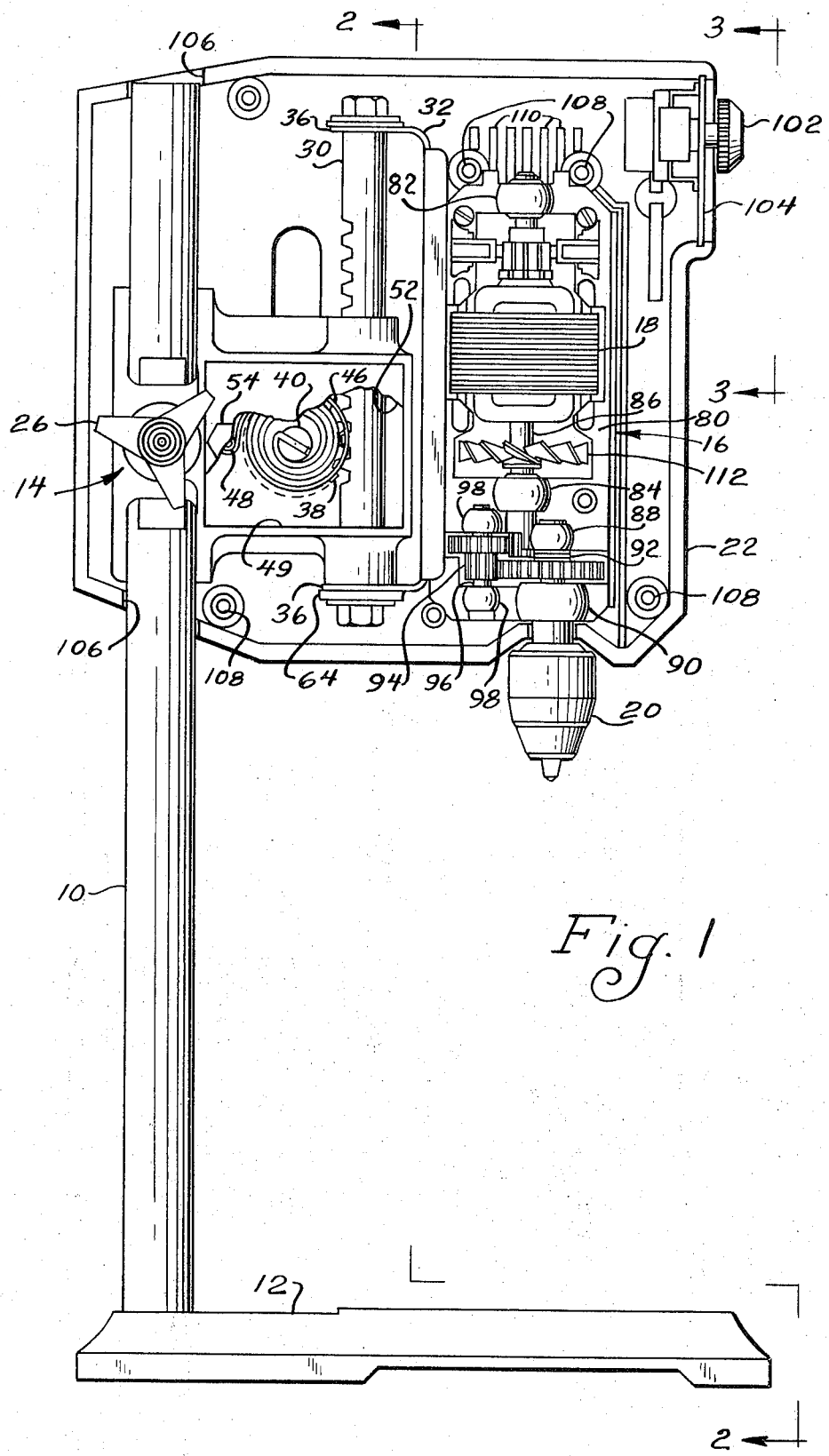
FIG. 1 is a side elevational view of the particular drill press where part of the casing is removed for clarity of disclosure.

Referring to FIG. 1 it can be noted that the disclosed unit includes a column 10 which upstands from a base 12, a column head 14 which is supported on the column and can be adjusted heightwise relative thereto, a power head 16 which includes a motor 18 and an output or powered chuck shaft 20, and support means between the power head 16 and the column head effective to move the former vertically toward or away from the base 12. A housing 22 overlies the power head unit 16 including the motor 18 and further overlies the column head 14 and that portion of the column 10 adjacent thereto.

More specifically, the column head 14 is typically a casting, such as of aluminum or steel, having a bore 24 which can be fitted freely over the end of the column and a lock bolt 26 which can be threaded relative to the casting tight against the column to accomodate the vertical height adjustment of the head. A second bore 28 is defined in laterally spaced parallel relationship to the column bore 24 and column 10 and this bore receives a rack shaft 30 which is connected at its opposite ends to bracket member 32 of the power head 16 such as by means of nuts 34. The rack shaft 30 and thus the supported power head 16 can thus move relative to the column head 14 until the ears 36 on the bracket 34 abut against the respective upper and/or lower surfaces of the column head 14, and this travel is the maximum travel of the output chuck 20.

Manual means are provided for shifting the power head 16 relative to the column head 14 and this includes a pinion 38 keyed on shaft 40 rotated in the column head, the pinion engaging the rack shaft 30, and a handle 44 (FIG. 4) is keyed to the pinion shaft to convert rotational handle movement to vertical movement of the power head 16. A torsion spring 46 can be keyed at its opposite ends between the column head and shaft 40, such as by one spring end bend overlying boss 48 of the column head and the opposite spring end being received in a cross slot of the pinion shaft 40, operable to elevate the power head 16 to its uppermost position relative to the column head whereat the lower ear is butted against the column head casting. The spring 46 can be nestled in a cavity 49 in the column head 14 and a cover 52 can be removably secured such as by bolt 54 threaded into the boss 48 for covering the recess and thereby hiding the spring 46.

The maximum power head 16 cutting stroke relative to the column head 14 as above noted is between where the opposite bracket ears 36 engage either the top or bottom surface of the column head 14. In the operation of the drill press it is frequently advantageous to intentionally limit the maximum cutting stroke to something less, and this is possible by reference to FIGS. 2 and 4 with a pair of adjustable set nuts 50 that are threaded on a guide post 60 secured as by nut 62 to extension bracket 64 of the power head 16 and this guide post 60 fits within spaced guides 66 formed on the column head 14. Adjustment of the lower set nut along the post determines where it abuts the guide edges 66 to limit the downward cutting stroke. The two nuts can be locked one against the other to maintain their adjusted position and the outer edges of the set nut can be knurled as shown. The set nuts 50 are exposed through an elongated slot 76 formed in the housing 22 and can be easily operated by the thumb and/or the fingers of the user for external adjustment. The guide post 60 has flat side 68 (FIG. 5) formed thereon and a set screw 70 formed typically of plastic or other low friction material can be threaded into the column head for abutment against the flat 68 to limit free play or wobble of the power head relative to the column head. Likewise an opening 78 can be provided in the housing 22 in alignment with the set screw 70 to allow easy periodic adjustment if such becomes necessary.

The particular power head 16 including the modular motor 18 and chuck shaft 20 can be similar to that disclosed in the Jacyno U.S. Pat. No. 3,694,680 issued Sept. 26, 1972 and assigned to the same assignee of this application. This construction would include for example a separate frame 80 which can be secured directly to the bracket 32 and which frame includes opposed channels which house bearings 82 and 84 for the motor armature shaft 86, and which house bearings 88 and 90 for the support of the output chuck shaft 20 with the thrust bearing 92 being provided to absorb the axial thrust of the shaft. Gears 94 of a speed reduction train can be located between the motor armature shaft 86 and the chuck output shaft 20 and they can be supported on secondary shaft 96 supported by spaced bearings 98 housed also in the frame.

An on-of switch 100 is provided for the control of the motor 18 by means of appropriate circuit connections (not shown) and likewise a variable resistor control 102 can be provided for varying the motor speed as is well known. These can be mounted on the front face plate 104 of the housing 22 to be easily manipulated by the left hand of the user while the right hand for example through the operating handle 44 would control the cutting stroke advance of the operating bit. The particular construction of the on-off switch or the variable speed control form no part of this invention and any typical unit can be employed.

The housing 22 can be a split as two pieces each covering half of the working components and the same can be secured such as by means of screws 108 through appropriate openings to unite with the power head 16. The housing thereby moves as a unit with the power head and since preferably the housing extends over the column, the housing is provided with openings 106 which line up with the column and freely receive the column. Vent openings 110 can be provided in the housing to allow for cooling air circulation caused by the fan 112 on the motor shaft 86.

It is to be understood that initially the height adjustment of the column head 14 relative to the base 12 is made by loosening the nut 26 and subsequently tightening same and the cutting stroke can be adjusted by the set nuts 50 carried on the guide post 60. Thereafter, controlled movement of the handle 44 in the direction toward the user (counterclockwise as seen in FIG. 4) lowers the power head 16 toward the base for the cutting operation. The operation of the motor can be readily determined by the on-off switch 100 and variable speed control 102.

I claim:

1. A drill press comprising a base, a column upstanding from the base, a column head and means holding the column head secure on the column at adjusted heights above the base, a power head having a motor and an output shaft and chuck thereon for receipt and support of a tool bit, means including a rack shaft secured to the power head and cooperating with the column head for supporting the power head and the motor for movement toward and away from the base between two operating positions, means carried by the column head in driving engagement with the rack shaft operable to move the power head between the operating positions, a guide post secured to the power head in laterally spaced parallel relation to the rack shaft and said column head having laterally disposed guide portions spanning the guide post and limiting pivotal free play of the power head about the rack shaft relative to the column head, a housing enclosing the power head including the motor and also enclosing the column head, means securing the housing to the power head, and the housing having openings for receipt of the column and of the power head moving means.

2. A drill press combination according to claim 1, wherein the housing comprises the sole means of electrically insulating the motor from the user of the drill press.

3. A drill press combination according to claim 2, further including means adjustably secured in fixed relation at various positions axially along the guide post operable as fixed to abut the column head to limit as adjusted the power head stroke relative to the column head, and the housing having an elongated opening therein to expose the adjustable secured means for external adjustment.

* * * * *